3. Sheets. Sheet. 1.

J. W. Penfield

Tile Machine.

No. 3,905. Reissued Apr. 5. 1870.

Witnesses.

A. D. Little

Geo. F. Marr

Inventor.

James W. Penfield by Prindle & Dyer.

3 Sheets. Sheet 2.

J. W. Penfield,

Tile Machine.

No. 3905. Reissued Apr. 5. 1870.

Witnesses.

A. E. Little

Geo. J. Ward

Inventor.

James W. Penfield by Pinkle & Dyer

Attys.

J. W. Penfield, 3. Sheets. Sheet. 3

Tile Machine.

No. 3905. Reissued Apr. 5. 1870.

Witnesses.

A. G. Smith

Saml. J. Marr

Inventor.

James W. Penfield by Brisbe & Dyer

Attys.

UNITED STATES PATENT OFFICE.

JAMES W. PENFIELD, OF CLEVELAND, OHIO.

IMPROVEMENT IN TILE-MACHINES.

*Specification forming part of Letters Patent No.* 98,519, *dated January* 4, 1870; *reissue No.* 3,905, *dated April* 5, 1870.

*To all whom it may concern:*

Be it known that I, JAMES W. PENFIELD, of Cleveland, in the county of Cuyahoga and State of Ohio, have invented certain Improvements in Drain-Tile Machines; of which the following is a specification.

The object of my invention is the greatest economy of space in the feeding of the material into the case where it receives the outside pressure; the convenient screening of the material before its issue, without the necessity of removing the screen for the purpose of cleansing it; the convenient removal of the tiles after they issue from the machine by means of a carriage and endless belt; the making of the drain-tiles in a more perfect manner, giving to every corresponding part of them an equal density of material; a more convenient and effective working of a cut-off valve; a mechanism by which the plunger and cut-off valve are operated separately and simultaneously by turns; and the nature of the invention consists, first, in a covering-valve of novel construction; second, in a novel valve-seat in connection with the covering-valve; third, in a sliding screen, a part of which may be cleaned while the remainder is in use within the machine; fourth, in a carriage, composed of rollers, an endless belt, and bars for conveying the tile away from the machine; fifth, in a tile-mold of novel construction, by means of which tiles may be made of uniform density and smoothness; sixth, of an adjustable brace in connection with the cut-off valve; seventh, the combination of the mechanism connected with and operating the cut-off valve, and that connected with and operating the plunger, for the purpose of giving an independent rapid motion to the cut-off valve in one direction and a simultaneous gradual motion to both cut-off valve and plunger in the other direction.

Figure 1:
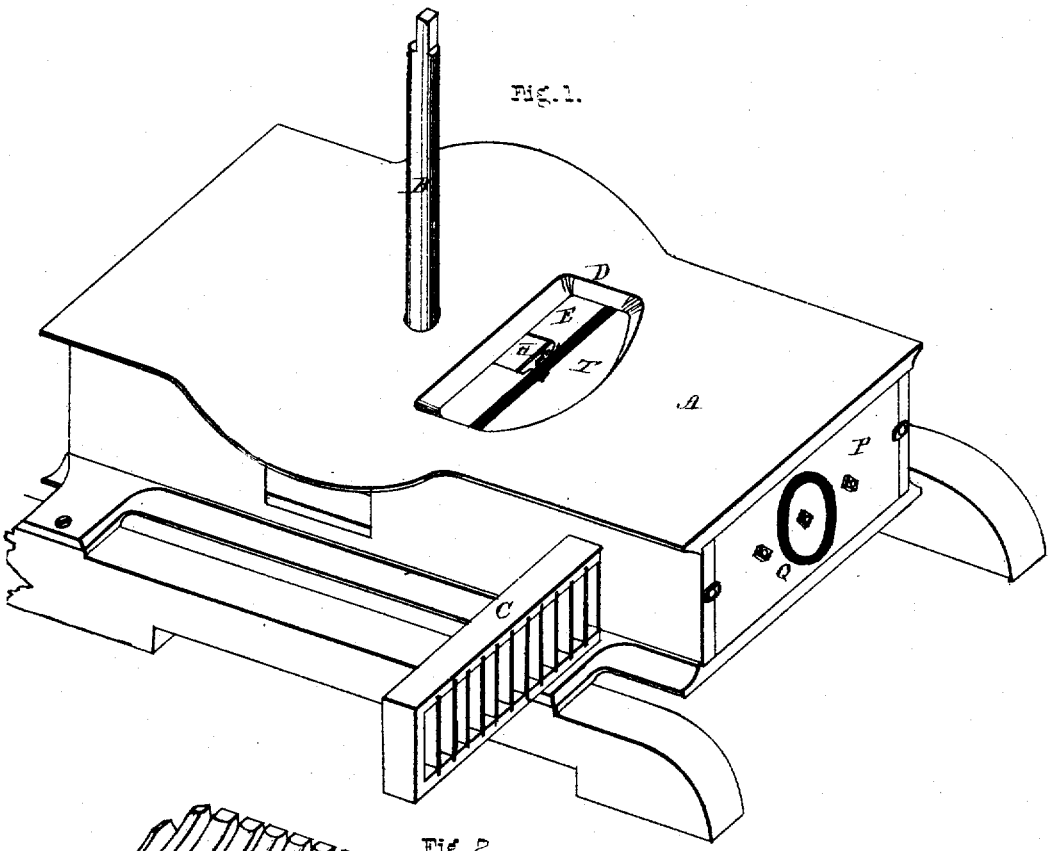
Figure 2:
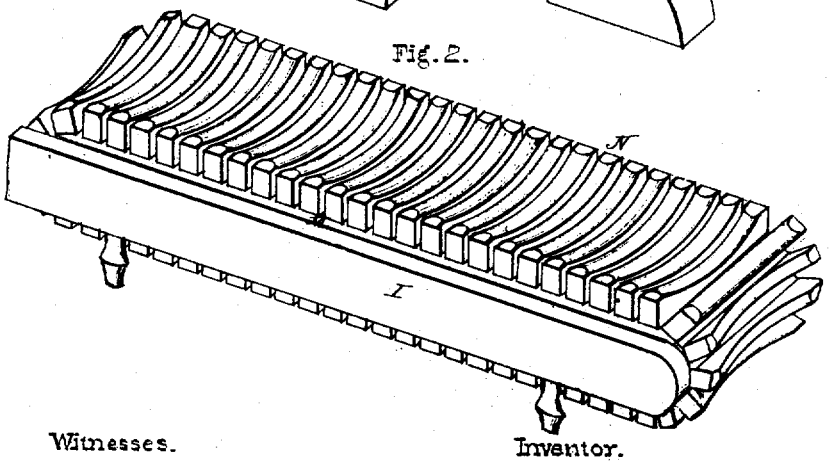
Figure 3:
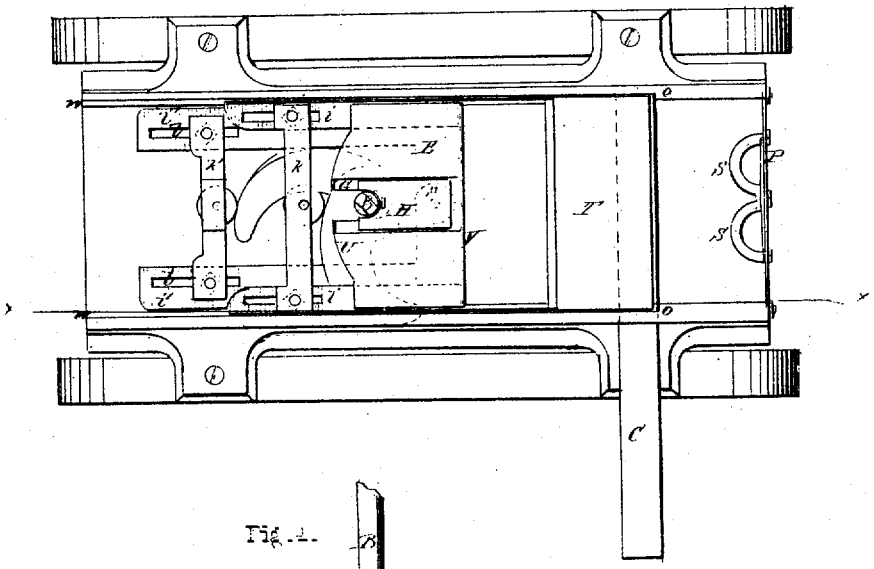
Figure 1:
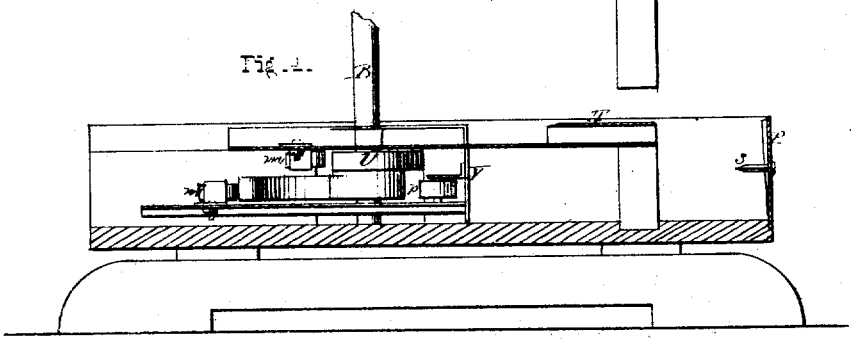
Figure 5:
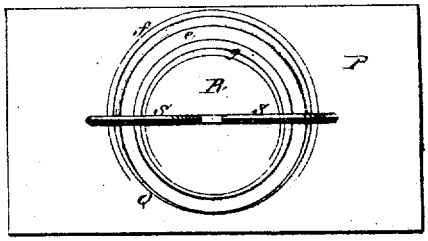
Figure 6:
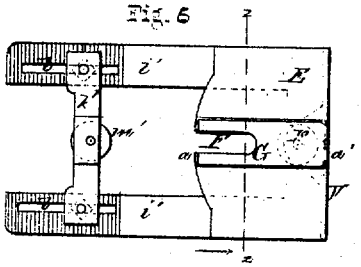
Figure 8:
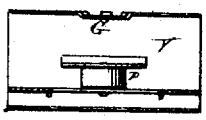
Figure 9:
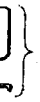
Figure 10:
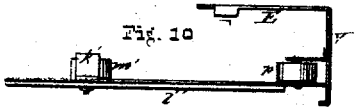
Figure 7:
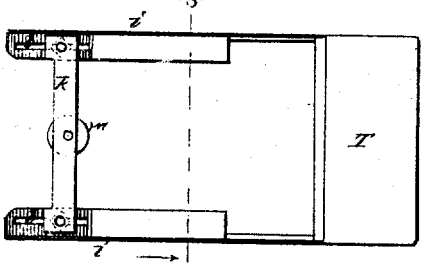
Figure 11:
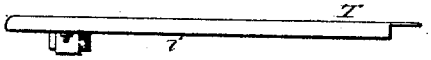
Figure 12:
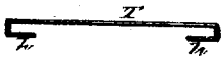
Figure 13:
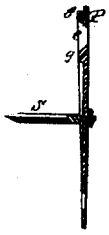
Figure 14:
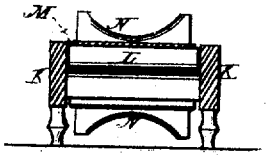
Figure 15:
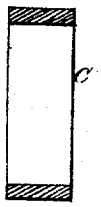

In the drawings, which represent my machine with the tub removed, Figure 1 is a perspective view of the machine, showing the front end of the same, with the tile-mold in position. Fig. 2 is a perspective view of the carriage. Fig. 3 is a view of the machine with the top removed, showing the interior working parts. Fig. 4 is a vertical section upon the line *x x* of Fig. 3. Fig. 5 is a rear elevation of the tile-mold. Fig. 6 is a plan view of the top uncovered, with the covering-valve removed. Fig. 7 is a plan view of the cut-off valve. Fig. 8 is a vertical cross-front section on the line *y y* of Fig. 6, showing the inside of the plunger; Fig. 9 is a plan and end views of the covering-valve. Fig. 10 is a side elevation of the plunger. Fig. 11 is a side elevation of one of the plunger-slides. Fig. 12 is a view of the front end of the cut-off valve. Fig. 13 is a side elevation of the core of the tile-mold. Fig. 14 is an end view of the carriage. Fig. 15 is a front elevation of the plunger-head.

In the drawings, A represents a box or case of suitable construction, upon which is placed the tub in which the clay is mixed, in such a position that the shaft B will be in the center of said tub. Between this shaft and the front of the case is an opening, D, through which the clay passes into the case, in front of the plunger. Within the case are contained the devices for operating the plunger, consisting of cams upon the shaft B, working slides by means of friction-rollers, to which slides are connected the plunger and the cut-off which closes the opening D.

The plunger, which is made of suitable sheet metal and provided with a top, E, of sufficient length, when moved forward in expressing the clay through the mold, to cover the opening D, fits closely to the inside of the case at all points. In this top E is a longitudinal opening, F, embracing the shaft B, which plays in the front end of it, when drawn back, and extending in the line of the length of the case to the rear end of said top. The object of this opening F is to allow the plunger to move back and forth past said shaft B. Upon the center of said top E is a depression, G, extending the whole length of it, somewhat wider than the opening F, and serving as a seat for the valve H, made sufficiently deep, so that when said valve is in position the top of it is upon a level with the remainder of the top E. This depression G is provided at each end with guards, *a a'*, which prevent the valve H from moving out of the same. The guard *a'* has openings in it through which the clay which collects in the depression G is pushed out by the valve H into the opening D of the case.

The valve H is made of proper sheet metal, of the form shown in Fig. 9, has a slot to embrace the shaft B, corresponding to the opening E, and is provided at the closed end of the slot with a spur, *b*.

Corresponding with the spur *b* is a channel in the under side of the top of the case, in which said spur traverses, of such a length as permits the valve H to move forward with the top E of the plunger only a part of the distance covered by the latter, so that the opening F is at no time uncovered.

The object of this valve is to enable the largest possible opening D to be made in the case A for the reception of the clay without exposing the shaft B and the working parts of the machine to the intrusion of the clay, which would clog their movements. It also increases very much the length of the throw of the plunger, enabling it to make longer tile than otherwise.

A screw, C, of ordinary construction passes transversely through the case A, in proper openings made in the side of the same, and just in front of the plunger-head when it is thrown forward.

This screen fills the entire vertical space of the interior of the case A, and is in length rather more than twice the breadth of said case. The object of this screen is to stop and retain stones and hard pieces of clay, so that they may not pass into the mold. It is made of the length described in order that when the part within the case becomes filled and clogged said part may be pushed entirely out of the case, where it may be cleaned, while the remainder is left in the case for use. The advantage of keeping some part of this screen continually in the case is that there is no delay to the work while the foul part is being cleaned, and it obviates the difficulty experienced in replacing a screen once removed, from the tendency of the softened clay to get into the channel-ways and into the openings of the case.

I represents a carriage, particularly represented in Fig. 2, which stands directly in front of the center of the machine and in line therewith. This carriage is composed of a longitudinal rectangular frame, K, supported on suitable legs and provided with a series of rollers, L, journaled into the side pieces of the frame in such a manner that the top of the rollers is about level with the top of the frame.

Traversing upon these rollers is an endless belt, M, to which are attached, side by side, but not quite touching, and across said belt, the bars N, which are of the form shown in Fig. 2, higher at each end than in the middle, leaving a channel along the upper center of the series of bars. Several belts may be used in which the bars have channels of different sizes, to be used for tiles of different dimensions. Motion is communicated to this belt by the force with which the tile issues from the machine, which force carries the tile and the belt along far enough to leave room for the succeeding tile. The object of the space between the bars is to allow the wires of the cutting-frame to pass between, in cutting the tiles of suitable length.

To the front of the case A is secured the mold-plate P, which forms the end of said case, and is secured thereto by buttons, or similar means. When it is intended to make large tiles this mold-plate is provided with one mold Q, in the center thereof, as represented in Figs. 1 and 5. When smaller tiles are to be made the mold-plate is provided with two or more molds, placed side by side, in said plate. These molds, of whatever size, are of similar form and construction, which is particularly shown in Figs. 5 and 13.

In the mold-plate a circular opening, *e*, of the requisite size is made, which opening is largest upon the inner side of the plate and is beveled upon all its parts. This bevel is very slight at the center of the bottom of the opening, not exceeding the angle of five degrees from a horizontal plane, and regularly increases upon each side of the opening to the center of the top, where it has an angle of about twenty degrees from a horizontal plane. The mold-plate is moreover made thicker by a rim, *f*, around the circumference of the opening *e*, upon the inside thereof, which rim starts upon each side near the bottom of said opening, at the plane of the inner face of said mold-plate, and gradually thickens on each side toward the center of the top of said opening, at which point the thickness of it is greatest, and is about equal to that of the mold-plate. This rim *f* is beveled at all parts correspondingly with the outer edge of the opening, where it is attached.

In the center of the opening described, a core, R, is secured in place by the double arch-brace S, in such a position that the front of said core is upon the plane of the mold-plate P. The space between this core and the outer circumference of the opening *e* will be the thickness of the walls of the tile made by the machine, and will vary accordingly with the description of tile desired. This core R is thickened by a rim, *g*, made in all respects like the rim *f*, and corresponding to it in all opposite points. This core and rim, moreover, is beveled like that of the outer edge of the opening *e*, except in the opposite direction, so that the opening from inside to outside is V-shaped, the larger part of the opening being inward. The bevel of the core, however, is made at a more acute angle than that of the outer edge of the opening, being at an angle of about thirty degrees at the bottom and forty-five degrees at the top, measured from a horizontal plane.

The double arch-brace S, which penetrates the plate on the center of each side of the opening, and the core at its center, and is secured at these points, is rounded at its inner and outer edges.

It is found in tile-making that the friction of the clay against the bottom and sides of the interior of the case, in the process of being forced out of the mold, is greater than it is at the top, being greatest at the bottom where the weight is greatest, and lessening regularly at the sides ascending, and becoming least at the top.

Similarly it is found that the friction is greatest at the bottom of the core, and decreases regularly toward the top, where it is least. The result, then, of pressing the clay through molds with a rectangularly-faced opening, or with openings having parallel edges, is that the material does not issue with the same density at the bottom of the opening as at the top, and the tile is more compact at the bottom than at the top, where it will be found to be porous and more or less cracked.

As I construct my mold, the plate, being thinnest at the bottom, and having very little bevel there, offers but little resistance to the clay at its issue, while the greater and regularly-increasing thickness of the plate and rim above and greater and increasing angle of the bevel retard the clay at all points sufficiently to counterbalance the friction of the inside of the case, and the weight of material at such corresponding points, and allows the clay to receive under the action of the plunger an equal density at all points. It is also desirable that the interior of the tile should be slightly more compact than the outside, which result is attained by giving the core a greater bevel at all points than the outer circumference of the opening at like points by means of which the clay upon the inside of the tile is slightly retarded and compressed more than that upon the outside.

The cut-off valve T, particularly shown in Fig. 7, made of suitable sheet metal, extends across the top of the inside of the case, fitting closely to it, with wings *h* turned downward at right angles, and then inward also at right angles with the former direction. It is in width sufficient to close the opening D, and is provided with arms *i*, which extend toward the rear box, the bottom parts of which arms are each turned inward at right angles toward the center of the case, and form guides upon which the top of the plunger traverses. These arms *i* are connected near their outer ends by a brace, *k*, which is adjustable longitudinally by means of set-screws in the ends thereof, operating in proper slots *l* in the ends of the arms before named, which ends are also provided with a series of cross-corrugations, for the purpose of assisting in holding the brace *k* more firmly in place.

In the center of the brace *k*, and beneath it, is a friction-roller, *m*, perfectly journaled. From the front of the openings for the screen C the top of the sides of the case is channeled, as shown in Fig. 2, by the cutting away of a portion of the same, leaving a bed, *n*, upon which the cut-off valve and arms traverse. The front end of this channel or bed *n* forms a shoulder, *o*, against which the front end of the valve T strikes, preventing its moving forward beyond that point. When the shaft B is turned, the upper cam U upon it strikes the friction-wheel *m* and moves the cut-off valve back over the opening D, entirely closing the same and shutting out the entrance of clay into the case A. When the plunger is thrown forward in pressing the clay through the molds, it strikes the rear of the cut-off valve and pushes it forward against the shoulder *o*.

The plunger V, constructed as before described in part and portrayed particularly in Fig. 6, has wings turned down from its top on either side, which wings traverse back and forth upon the arms *i*, of the cut-off valve, which serve as guides. This plunger is provided with a head which fills the entire cross-cavity of the case A, and is without sides. It is provided near its bottom with arms *i'* similar in construction to the arms *i*, and of equal length, and with a like arrangement of an adjustable brace, *k*, and a friction-wheel, *m'*, except that this wheel is upon the top of said brace. It is also provided with cross-corrugations at the ends of its arms, in like manner with the arms *i*. Another brace, however, upon the rear of the plunger-head, connects said arms, and has journaled upon it a friction-roller, *p*, upon the same planes as the friction-roller *m'*.

Each of these friction-rollers is placed a little upon one and the same side of the center of the case, and toward the side from which they receive the impact of the cams.

The plunger is operated by the lower cam upon the main shaft B, which in revolving strikes first the friction-roller *p*, and throws the plunger forward, and in its further revolution strikes the friction-roller *m*, and draws the plunger back.

At the instant the plunger is drawn back and the case is filled with clay through the opening D, which is then uncovered, the upper cam, which is comparatively straight in its face, strikes the friction-roller *m*, and draws the cut-off valve with a sudden motion over the opening D, and excludes all clay from the case. Immediately afterward, the lower cam, which is quite curved upon its face, strikes the friction-roller *p* and forces the plunger forward with a steady, uniform, and not rapid motion. In passing forward the top of the plunger and the cut-off valve, which it pushes before it, serve to keep the opening D closed so that no clay can enter the case. In its further revolution, the same cam strikes the friction-roller *m'*, and moves the plunger back alone with a steady and not rapid motion, giving time for the clay to enter and fill the case.

Having thus fully described the nature and merits of my improvements, what I claim as my invention, and desire to secure by Letters Patent, is—

1. The covering-valve H, constructed substantially as shown and described and for the purpose set forth.

2. In connection with the valve H, the depression or valve-seat G, provided with guards *a a'*, constructed as shown and described, and for the purpose set forth.

3. The horizontally-adjustable screen C, arranged as described and shown, so that one portion of it may be cleaned while the other portion remains in use within the case A, as and for the purpose set forth.

4. The carriage I, provided with the rollers L, the endless belt M, and the bars N, when each of said parts is constructed as shown and described, and for the purposes set forth.

5. The tile-mold Q, provided upon its inside with the rim *f*, of regularly-increasing thickness upward, and with the outer edge of its opening *e* beveled inwardly at a regularly-increasing angle upward, in combination with the core R, provided upon its inside with the rim *g*, regularly increasing in thickness upward, and with its outer edge beveled inwardly at a regularly-increasing angle upward, which bevel is, however, at a greater angle at all points than that of the outer edge of the opening *e*, and secured in place by the double arch-brace S, when each of said parts is constructed as shown and described, and for the purposes set forth.

6. The adjustable brace *k*, applied to the slide *i* in connection with the cut-off rake T, when these parts are constructed and combined to operate as and for the purpose set forth.

7. The combination, with the parallel arm, *i*, adjustable brace *k*, and friction-wheel *m*, in connection with the cut-off valve T and the parallel-arms *i*, adjustable brace *k*, and friction wheel *m'* and *p*, in connection with the plunger V, with the cams upon the main shaft B, whereby an independent rapid motion is given to the cut-off valve in one direction, and a simultaneous gradual motion is given to both the cut-off valve and the plunger in the other direction, as hereinbefore explained and set forth.

J. W. PENFIELD.

Signed in the presence of—
GEORGE HESTER,
J. S. HARTZELL.